United States Patent
Orvedahl et al.

(10) Patent No.: US 11,719,213 B2
(45) Date of Patent: Aug. 8, 2023

(54) SYSTEMS AND METHODS FOR PREVENTING ACTIVATION OF A STARTER BASED ON ENGINE SPEED

(71) Applicant: Illinois Tool Works Inc., Glenview, IL (US)

(72) Inventors: Travis Orvedahl, Neenah, WI (US); John Steffens, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/035,268

(22) Filed: Sep. 28, 2020

(65) Prior Publication Data
US 2021/0115890 A1 Apr. 22, 2021

Related U.S. Application Data

(60) Provisional application No. 62/924,377, filed on Oct. 22, 2019.

(51) Int. Cl.
*F02M 11/08* (2006.01)
*F02N 11/10* (2006.01)
(Continued)

(52) U.S. Cl.
CPC ......... *F02N 11/105* (2013.01); *F02B 63/042* (2013.01); *F02N 11/08* (2013.01);
(Continued)

(58) Field of Classification Search
CPC .. F02N 11/101; F02N 11/105; F02N 11/0807; F02N 11/0848; F02N 2200/022; F02B 63/042; F02D 2200/101
See application file for complete search history.

(56) References Cited

U.S. PATENT DOCUMENTS

| | | | | |
|---|---|---|---|---|
| 3,712,283 A | * | 1/1973 | Kiess | ................ H02H 7/09 123/179.5 |
| 3,857,043 A | * | 12/1974 | Habasch | ............. F02N 11/0848 290/37 R |

(Continued)

FOREIGN PATENT DOCUMENTS

| | | |
|---|---|---|
| DE | 102007009568 | 9/2008 |
| DE | 102013225851 | 6/2015 |

(Continued)

OTHER PUBLICATIONS

European Office Communication Appln No. 20201551.7 dated Mar. 19, 2021.

*Primary Examiner* — John Kwon
*Assistant Examiner* — Arnold Castro
(74) *Attorney, Agent, or Firm* — McAndrews, Held & Malloy, Ltd.

(57) ABSTRACT

Systems and methods for preventing activation of a starter when engine speed is above a threshold engine speed value are disclosed. In examples, an engine driven power system includes an engine and a current transformer to generate an induced current in response to an excitation current from an excitation circuit. As the excitation current is induced in response to rotational movement of the engine, the excitation current and the induced current exhibits characteristics corresponding to engine speed. A control circuit receives a signal from the current transformer representing characteristics representative of engine speed and determines the engine speed, compares the characteristics to a list of values that correlates current characteristics to engine speed, compare a list of threshold engine speed values to the calculated engine speed value, and prevents activation of an engine starter if the control circuitry determines that the engine speed exceeds the threshold engine speed value.

20 Claims, 6 Drawing Sheets

(51) Int. Cl.

| | |
|---|---|
| *F02D 29/06* | (2006.01) |
| *F02D 41/02* | (2006.01) |
| *F02D 41/06* | (2006.01) |
| *F02B 63/04* | (2006.01) |
| *F02N 11/08* | (2006.01) |
| *G05D 1/00* | (2006.01) |

(52) U.S. Cl.
CPC ......... *F02N 11/0807* (2013.01); *G05D 1/005* (2013.01); *G05D 1/0016* (2013.01); *G05D 1/0022* (2013.01); *F02N 2011/0881* (2013.01); *F02N 2200/022* (2013.01)

(56) References Cited

U.S. PATENT DOCUMENTS

| | | | | |
|---|---|---|---|---|
| 4,032,792 | A * | 6/1977 | Parkyn | G01P 3/4805 |
| | | | | 290/37 R |
| 4,070,585 | A * | 1/1978 | Parkyn | F02N 11/105 |
| | | | | 290/37 A |
| 4,293,756 | A * | 10/1981 | Hoyt, Jr. | B23K 9/1012 |
| | | | | 290/31 |
| 5,094,199 | A * | 3/1992 | Griffin | F02N 11/105 |
| | | | | 290/38 R |
| 7,614,377 | B2 * | 11/2009 | Noguchi | F02N 11/105 |
| | | | | 361/33 |
| 7,775,090 | B1 | 8/2010 | Rankin | |
| 2004/0144351 | A1 * | 7/2004 | Janisch | F02N 11/0807 |
| | | | | 307/10.6 |
| 2015/0273607 | A1 | 10/2015 | Denis | |

FOREIGN PATENT DOCUMENTS

| | | |
|---|---|---|
| EP | 2002917 | 12/2008 |
| GB | 2517752 | 3/2015 |

* cited by examiner

SYSTEMS AND METHODS FOR PREVENTING ACTIVATION OF A STARTER BASED ON ENGINE SPEED

CROSS REFERENCE TO RELATED APPLICATIONS

This application is a Non-Provisional Patent Application which claims priority to U.S. Provisional Patent Application No. 62/924,377, entitled "Systems And Methods For Preventing Activation Of A Starter Based On Engine Speed", filed Oct. 22, 2019, the contents of which are herein incorporated by reference in their entirety.

BACKGROUND

Conventionally, engine-driven power systems employ a starter with an electric motor to start the engine. If the engine is running when the starter motor is activated, the starter and/or the engine could be damaged. It is therefore desirable to employ systems and methods that reduce the risk of activating the electric starter motor while the engine is running.

SUMMARY

Systems and methods for preventing activation of a starter when engine speed is above a threshold engine speed value are disclosed, substantially as illustrated by and described in connection with at least one of the figures.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1A:
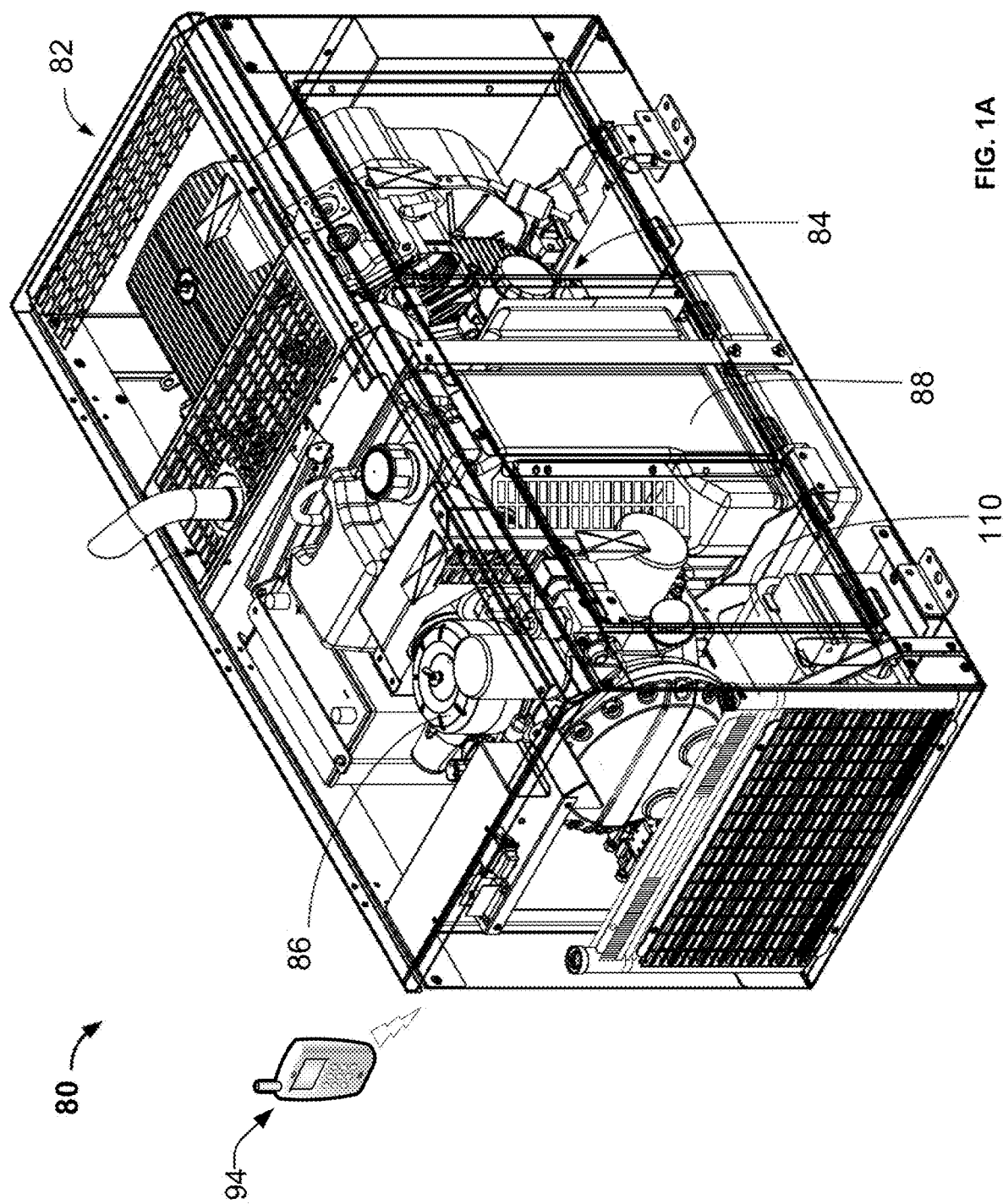
FIG. 1A is a perspective view of an example power system arranged within an enclosure.

Disclosed are systems and methods for preventing activation of a starter when engine speed is above a threshold engine speed value. In particular, in disclosed examples, an engine driven power system includes an engine (e.g., a diesel-powered engine). A detection circuit is included to receive an output of the engine to determine engine speed. In some examples, the detection circuit includes current transformer to generate an induced current in response to an excitation current from an excitation circuit of the detection circuit. For example, the excitation current is in response to rotational movement of the engine (e.g., generated via a field coil). As the excitation current is induced in response to rotational movement of the engine, the excitation current and the induced current may exhibit one or more characteristics corresponding to engine speed. In some examples, the one or more characteristics correspond to one or more of a phase, a frequency, a period, a rate of change, or power output of the induced current.

The system further includes a control circuit. The control circuit is operable to receive a signal from the current transformer representing the one or more characteristics representative of engine speed. Based on the one or more characteristics, the control circuit determines the engine speed. For example, the control circuit can use the one or more characteristics to calculate the engine speed by employing an algorithm (e.g., using the characteristics as variables to infer engine speed), or by comparing the one or more characteristics to a list of values that correlates current characteristics to engine speed. Once the engine speed is determined, the control circuit can access a list of engine speed values corresponding to threshold engine speed values, and compare the list of engine speed values to the calculated engine speed value. In some examples, the threshold engine speed values represent operational values, or a value provided via a user interface (e.g. an operator input).

Once it is determined that the engine speed exceeds the threshold engine speed value, the control circuit prevents activation of an engine starter to ensure the starter is not unnecessarily activated while the engine is rotating. In other words, preventing the engine starter from activating prevents the gears from the engine flywheel and the engine starter from turning out sync with one another, thereby preventing grinding of the gear teeth and damaging one or both of the engine or the engine starter.

In some examples, the control circuitry may provide data to the remote device that the engine has started (and/or reached a predetermined speed). The remote device may then automatically command the starter disengage, and/or provide an indication to the operator that the engine has started. Receiving confirmation that the engine has started and/or reached a predetermined speed ensures that the remote device does not prematurely stop cranking the engine (e.g., via the starter), which would result in a failed engine start, and/or the remote device does not continue to command the starter to engage with the engine, which would result in damage to the starter and/or the engine.

In some examples, the excitation circuit is arranged near the engine (e.g., within a magnetic field generated in response to rotation of the engine via permanent magnets or by field coils), such that the excitation current generated in the excitation circuit is synchronized with the engine speed based on rotational movement of the engine. Thus, the control circuit serves as an anti-grind circuit by using feedback data corresponding to synchronous current from the excitation circuit.

Conventionally, starters were activated at the location of the engine. Thus, the operator would be able to hear, see, and/or feel that the engine was running. The chances that an operator would inadvertently activate a starter on a running engine was small accordingly. With the advent of remote and/or wireless starter controls, the operator may not be able to hear, see, and/or feel the running engine. Some controllers came limited with a single on-off controller, such that each input would turn on an engine that was not running, or turn off an engine that was running. However, each time a running engine was turned off, it would require the starter to unnecessarily activate, and could lead to an engine being off when a particular operation requires the engine to be at idle.

In disclosed examples, the control circuitry automatically identifies the speed at which the engine is operating, and limits the opportunity to reactivate the starter if the engine is rotating at or above a threshold value (e.g., a calculated or predetermined threshold engine speed value).

Advantageously, the disclosed systems and methods prevent control circuitry from engaging an electric starter motor when the engine speed is above a predetermined level. The result is prevention of an electric starter motor from overspeeding and grinding the starting gear, which prevents damage to the starter itself as well as preventing damage to the engine.

Additionally, the disclosed systems and methods eliminate the need for engine manufacturers to make provisions to the engine operating circuitry to capture information regarding engine speed or other characteristics, and/or to transmit signals corresponding to those characteristics, as the engine speed is being determined at the welding circuitry. This further eliminates time delays in determining engine start and/or speed at the welding circuitry, as well as avoids inclusion of special equipment from the engine manufacturer. Advantageously, the detection and determination circuity is applicable to any type of engine (e.g., gas engine or a diesel engine, which may not have an ignition signal. This eliminates additional components, complexity, ordering numbers, etc., while making the system easier to maintain and operate.

In disclosed examples, an engine driven power system includes an engine; a current transformer configured to generate an induced current in response to an excitation current from an excitation circuit, wherein the induced current comprises one or more characteristics corresponding to engine speed; and a control circuit configured to: receive a signal from the current transformer representing the one or more characteristics; determine the engine speed based on the one or more characteristics; and preventing activation of an engine starter in response to the engine speed exceeding a threshold engine speed value.

In some examples, the excitation circuit is arranged near the engine, such that the excitation current generated in the excitation circuit is synchronized with the engine speed based on rotational movement of the engine.

In some examples, preventing activation of the engine starter comprises activating an interlock to prevent power from reaching the engine starter. In some examples, preventing activation of the engine starter comprises disabling one or more user interfaces associated with the engine starter, the user interface comprising one or more of a knob or a graphical user interface.

In some examples, to determine the engine speed, the control circuit is further configured to compare the one or more characteristics to a list of values that correlates current characteristics to engine speed. In some examples, to determine the engine speed, the control circuit is further configured to: access a list of engine speed values corresponding to threshold engine speed values; and compare the list of engine speed values to the calculated engine speed value. In some examples, to determine the engine speed, the control circuit is further configured to calculate engine speed based on the one or more characteristics.

In some examples, the one or more characteristics comprises one or more of a phase, a frequency, a period, a rate of change, or power output.

In some examples, the control circuit is further configured to generate an alert in response to the determination that the engine speed is above the threshold engine speed value. In some examples, the alert is one or more of an audible, visual, or haptic indicator. In some examples, the alert is provided via one or more of a first user interface associated with the power system or a second user interface associated with a remote control system.

In some examples, the remote control system is a wireless remote configured to receive data from or transmit data to the control circuit.

In some examples, a comparator circuit receives the signal, wherein to determine the engine speed, the comparator circuit compares the one or more characteristics of the signal to one or more predetermined voltage values corresponding to engine speed.

In disclosed examples, an engine driven power system includes an engine; a detection circuit external to the engine configured to receive an output of the engine comprising one or more characteristics corresponding to engine speed; and a control circuit configured to: receive a signal from the detection circuit representing the one or more characteristics; determine the engine speed based on the one or more characteristics; and preventing activation of an engine starter in response to the engine speed exceeding a threshold engine speed value.

In some examples, the detection circuit is a frequency counting circuit. In some examples, the detection circuit is an edge detection type circuit. In some examples, the detection circuit is an excitation circuit arranged near the engine, such that the excitation current generated in the excitation circuit is synchronized with the engine speed based on rotational movement of the engine.

In some examples, a comparator circuit receives the signal, wherein to determine the engine speed, the comparator circuit compares the one or more characteristics of the signal to one or more predetermined voltage values corresponding to engine speed.

In some examples, to determine the engine speed, the control circuit is further configured to calculate engine speed based on the one or more characteristics, the one or more characteristics comprises one or more of a phase, a frequency, a period, a rate of change, or power output.

In some examples, preventing activation of the engine starter comprises disabling one or more user interfaces associated with the engine starter, the user interface comprising one or more of a knob or a graphical user interface.

Several examples are provided with respect to diesel engines driving one or more of a generator, an air compressor, and/or a welding power supply. However, the concepts and principles disclosed herein are equally applicable to various engine-driven products, including but not limited to home-standby generators, portable generators, and/or vehicles.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, the terms "first" and "second" may be used to enumerate different components or elements of the same type, and do not necessarily imply any particular order.

The term "welding-type system," as used herein, includes any device capable of supplying power suitable for welding, plasma cutting, induction heating, Carbon Arc Cutting-Air (e.g., CAC-A), and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "memory" includes volatile and non-volatile memory devices and/or other storage device.

As used herein, the term "torch," "welding torch," "welding tool" or "welding-type tool" refers to a device configured to be manipulated to perform a welding-related task, and can include a hand-held welding torch, robotic welding torch, gun, gouging tool, cutting tool, or other device used to create the welding arc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW, e.g., TIG), shielded metal arc welding (SMAW), spray, short circuit, CAC-A, gouging process, cutting process, and/or any other type of welding process.

As used herein, the term "welding program" or "weld program" includes at least a set of welding parameters for controlling a weld. A welding program may further include other software, algorithms, processes, or other logic to control one or more welding-type devices to perform a weld.

FIG. 1A is a perspective view of an example power system 80 arranged within an enclosure 82. The example power system 80 of FIG. 1A is an engine-driven power system. The system 80 includes an engine 84 that drives a generator 86 to generate electrical power. The engine 84 receives fuel from a fuel tank 88. The generator 86 provides the electrical power to an air compressor 88 and/or power conversion circuitry 110. The power conversion circuitry 110 provides one or more types of electrical power suitable for specific and/or general purpose uses, such as welding power, 110VAC and/or 220 VAC power, battery charging power, and/or any other type of electrical power. The example system 80 may include other components not specifically discussed herein.

Figure 2A:
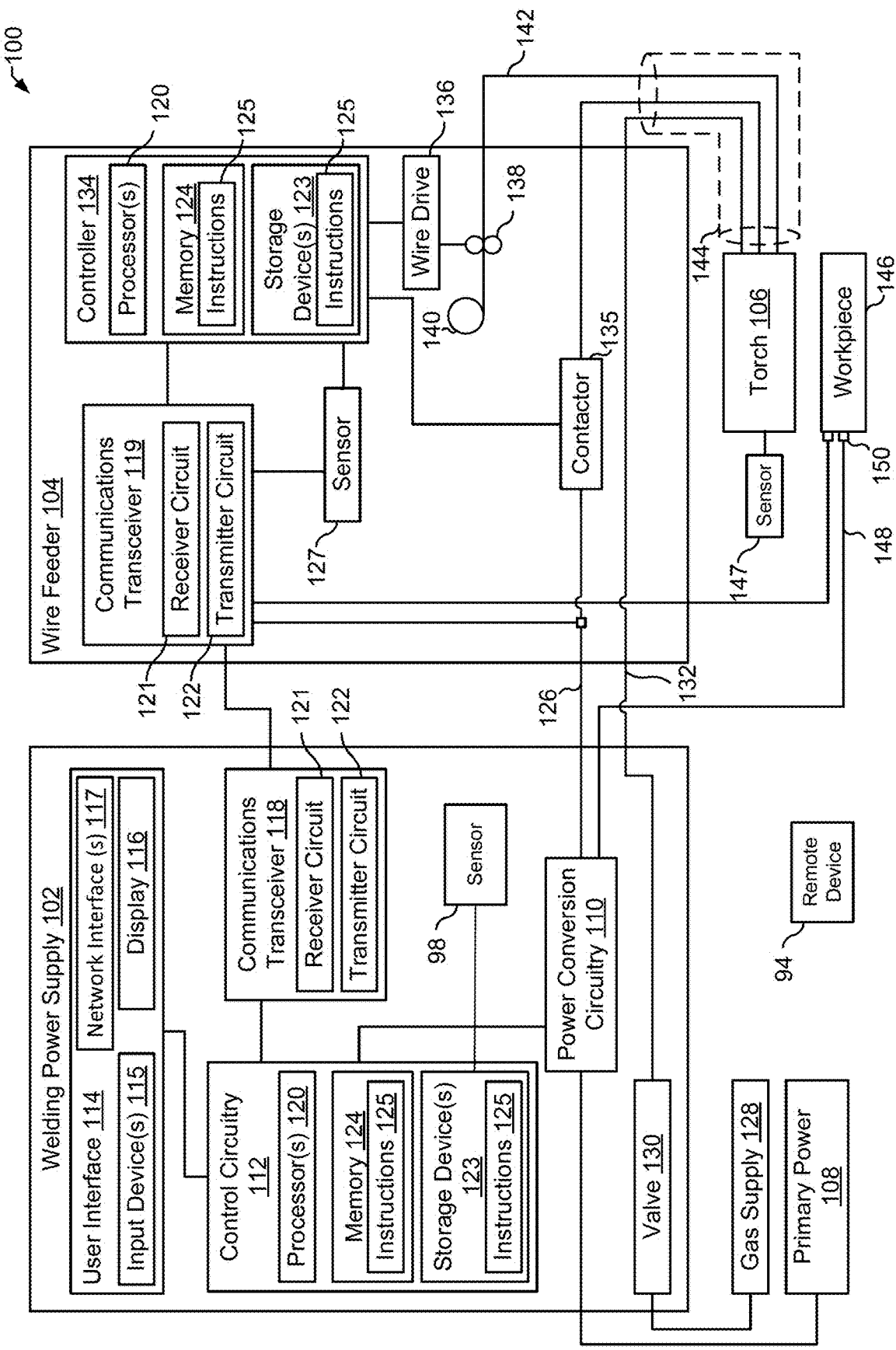
FIG. 2A is a schematic diagram of an example welding system, in accordance with aspects of this disclosure.
Figure 2B:
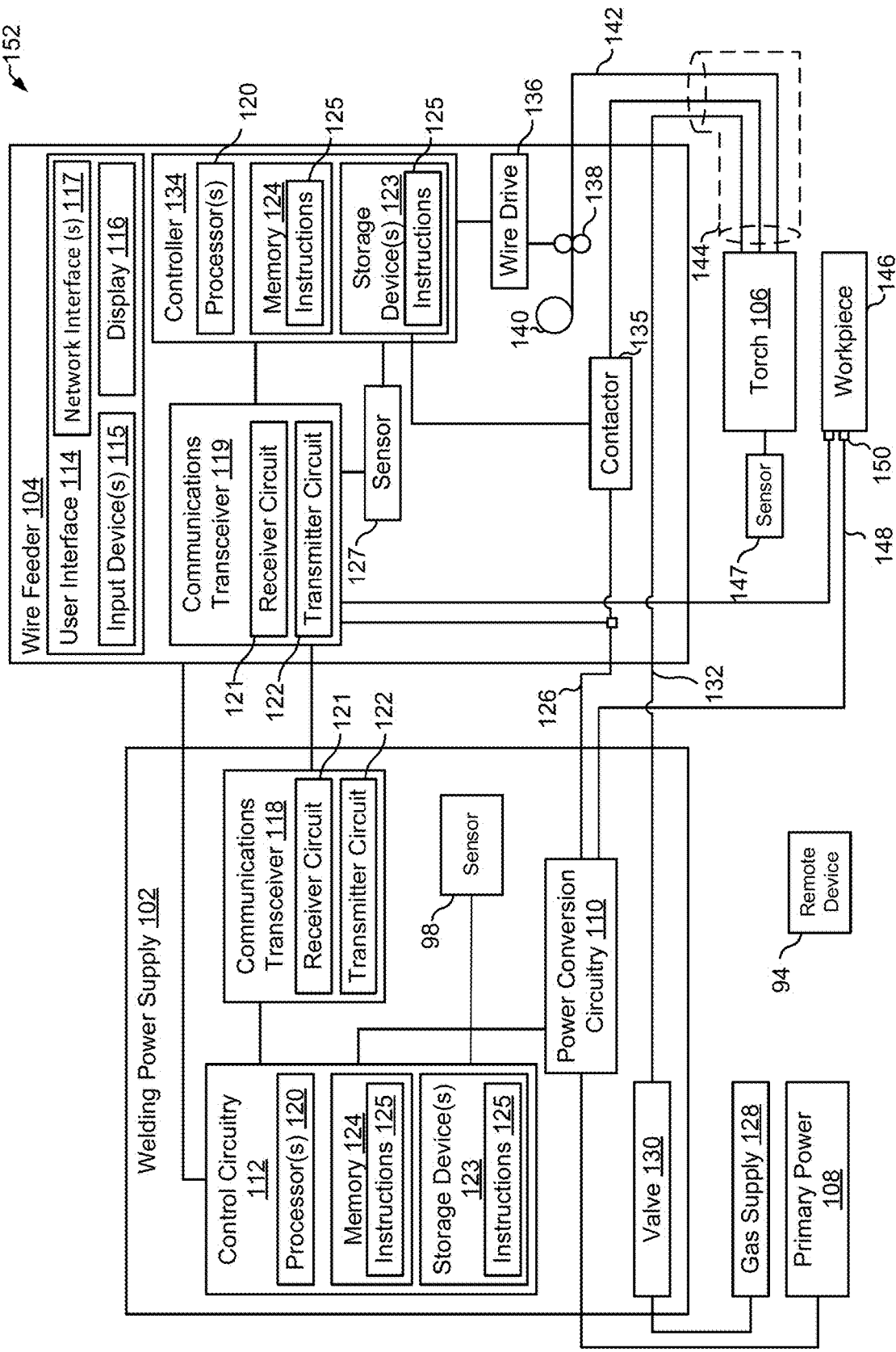
FIG. 2B is a schematic diagram of another example welding system, in accordance with aspects of this disclosure.
Figure 2C:
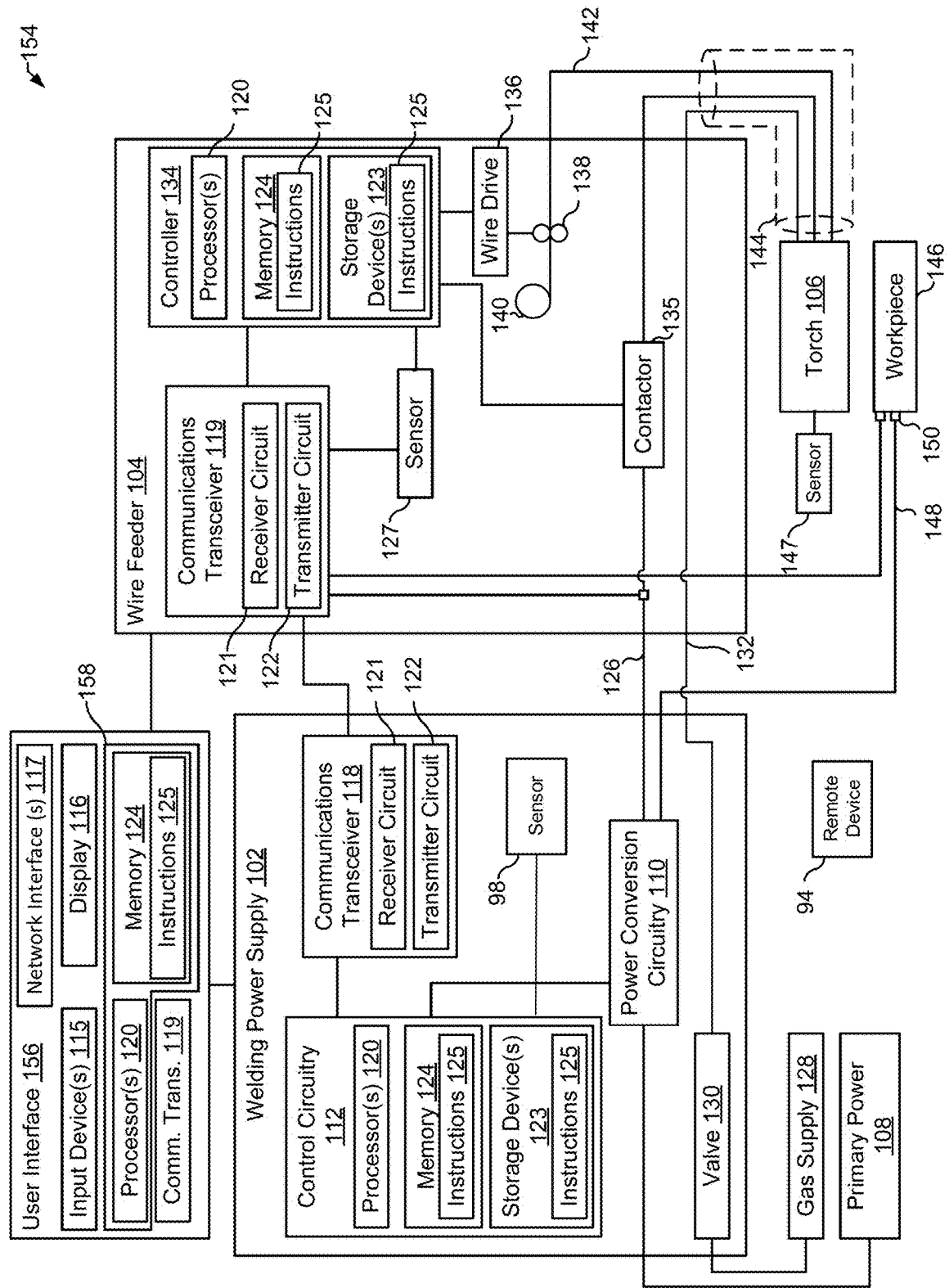
FIG. 2C is a schematic diagram of another example welding system, in accordance with aspects of this disclosure.

In some examples, a control circuitry 112 is included with the power conversion circuitry 110 (as shown in FIGS. 2A-2C). In other examples, the control circuitry 112 is located within the enclosure 82 in a location separate from the power conversion circuitry 110. In some examples, the control circuitry 112 is located outside the enclosure 82 and communicates with components and/or circuits within the enclosure 86 via wired and/or wireless connections (e.g., network interfaces, transceivers, etc.).

In some examples, a remote device 94 is configured to control one or more operations of the system 80. For example, the remote device 94 can include a display (e.g., a graphical user interface, and/or a touchscreen), as well as one or more input devices (e.g., a button, knob, switch, and/or a touchscreen). By use of the remote device 94, an operator can transmit commands as well as receive information and alerts from system 80 via one or more of a communications transceiver and/or interface (e.g., associated with control circuitry 112, as shown in FIGS. 2A-2C). Additionally, the remote device 94 may provide the status of the power system 80 and the connected components (e.g., on the display and/or via audible and/or haptic feedback).

Figure 1B:
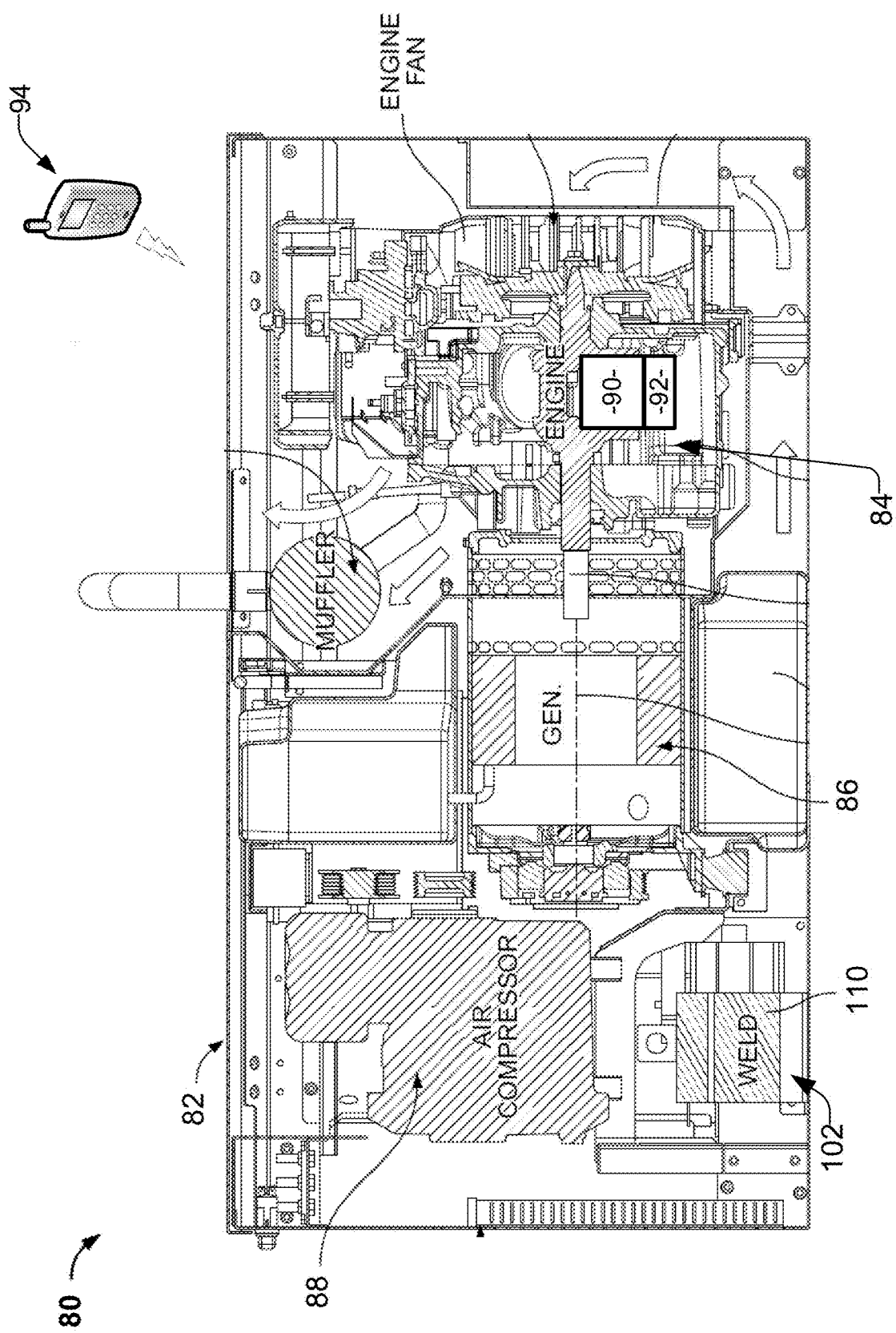
FIG. 1B is a side view of the example power system of FIG. 1A.

FIG. 1B is another perspective view of the example power system 80 with selected panels of the enclosure 82 and the fuel tank 88 removed. The arrangements of the engine 84, the generator 86, the air compressor 88, and the power conversion circuitry 112 can be more easily seen in FIG. 1B. The disclosed example power system 80.

In some examples, a detection circuit or sensor 90 is configured to receive an output from the engine 84 to measure, calculate, or otherwise determined engine speed. In non-limiting examples, the circuitry 90 includes an excitation circuit, a frequency counting circuit or edge detection type circuit, an alternating current (AC) Voltage Frequency; an Exciter Voltage Feedback Voltage level or Frequency Measurement (e.g., with a Zero-Cross or Voltage level-cross Circuit); an Encoder/Resolver on a Rotor to measure speed (e.g., with a quadrature-type feedback, and/or a pulsed encoder feedback); a Throttle Position Sensor; a Magnetic Pick-up on the Ring gear/flywheel of the engine; etc. The control circuitry 112 receives an input associated with engine speed (e.g., rotations of the engine; cyclical changes in an output waveform; etc.) from such a device or circuit, and calculates the engine speed based thereon. As disclosed herein, the system 80 is configured to determine the engine speed based on information generated from engine operation (e.g., output, power characteristics, etc.), rather than from circuits and/or sensors integrated with the engine.

Accordingly, the disclosed system 80 is configured to determine the engine speed from circuitry external to the engine 84 itself. Thus, in some examples, the welding power supply 102 may include the circuitry 90, which receives an output of the engine corresponding to engine speed without tapping into engine circuitry. The engine may then be changed and/or replaced without the need to connect with the engine operational circuitry to determine engine speed.

For instance, an excitation circuit may be arranged near a current transformer 92 (e.g. on or near the engine 84) such that when excitation current flows, a current is induced in the current transformer circuit 92 that is synchronous to engine speed. This induced current is then translated to a signal that is read by the control circuitry 112. This control circuitry 112 then uses the synchronous signal to determine engine speed and, if engine speed is above a certain level, prevents the circuit that controls starting of the engine 84 from activating.

For example, the operator may utilize the remote device 94 to select a command to start the engine 84. As disclosed herein, the control circuitry 112 receives a signal from the current transformer 92 representing one or more characteristics of the induced current (e.g., a phase, a frequency, a period, a rate of change, and/or power output). Based on the one or more characteristics, control circuitry 112 determines the engine speed. For instance, to determine the engine speed, the control circuit 112 can access a list (e.g., stored in memory) to compare the one or more characteristics to a list of values that correlates current characteristics to engine speed. In some examples, the control circuitry 112 calculates engine speed based on the one or more characteristics.

Based on the correlation and/or calculation, the control circuitry 112 can identify the engine speed, compare the engine speed to the threshold engine speed value and, if the engine speed value exceeds the threshold engine speed value, the control circuitry 112 can prevent the starter motor from engaging, as disclosed herein.

In some examples, the control circuitry 112 includes a comparator circuit configured to determine the engine speed. For instance, the comparator circuit can compare the characteristics of the received signal (provided directly to the comparator circuit from the control device and/or via the control circuitry 112) to one or more predetermined voltage values corresponding to engine speed. The predetermined voltage values can be calculated (e.g., as a percentage of a measured or reference voltage, and/or calculated by applying one or more threshold values to the measured or reference voltage), and/or accessed via a list associated voltage values with engine speeds. In some examples, the predetermined voltage values are included with a weld schedule and/or preset operating parameters, whereas in other examples an operator may customize the predetermined voltage values.

In some examples, the control circuitry 112 prevents activation of the engine starter by activating an electronic and/or mechanical interlock to prevent power from reaching the engine starter. In examples, the control circuitry 112 prevents activation of the engine starter by disabling one or more user interfaces associated with the engine starter (e.g., a knob and/or a user interface on remote device 94 and/or interfaces 114, 156).

In some examples, the control circuitry 112 generates an alert in response to the determination that the engine speed is above the threshold engine speed value, such as an audible, visual, and/or haptic indicator. For example, the alert can be provided via a first user interface associated with the power system 80 or a second user interface associated with remote device 94 and/or another remote control system (e.g., a remote computer, processor, smartphone, etc.).

In examples, the operator may be located remote from the power system 80. In some examples, the operator is near the power system 80, and utilizes a user interface to send commands to or receive information from the control circuitry 112 (e.g., a user interface 114, 156, as shown in FIGS. 2A-2C).

FIG. 2A is a block diagram of an example welding system 100, which includes welding-type power supply 102 containing the power circuitry 110 and control circuitry 112 described with respect to FIGS. 1A and 1B. As shown in FIG. 2A, the example welding system 100 also includes a wire feeder 104, and a welding torch 106. The welding system 100 powers, controls, and supplies consumables to a welding application. Although illustrated with respect to a welding type power supply 102 and welding wire feeder 104, the engine driven power system 80 may implement the anti-grind process independent of a welding power supply or controller (e.g., such as a home or portable generator, an engine powered vehicle, etc.).

In some examples, the power supply 102 receives power from the engine 84 (e.g., via generator 86) and directly supplies input power to the welding torch 106 via power conversion circuitry 112. The welding torch 106 may be a torch configured for shielded metal arc welding (SMAW, or stick welding), gas tungsten arc welding (GTAW, or tungsten inert gas (TIG)) welding, gas metal arc welding (GMAW), flux cored arc welding (FCAW), based on the desired welding application. In the illustrated example, the power supply 102 is configured to supply power to the wire feeder 104, and the wire feeder 104 may be configured to route the input power to the welding torch 106. In addition to supplying an input power, the wire feeder 104 may supply a filler metal to a welding torch 106 for various welding applications (e.g., GMAW welding, flux core arc welding (FCAW)). While the example system 100 of FIG. 2A includes a wire feeder 104 (e.g., for GMAW or FCAW welding), the wire feeder 104 may be replaced by any other type of remote accessory device, such as a stick welding and/or GTAW welding remote control interface that provides stick and/or GTAW welding The power supply 102 receives primary power 108 (e.g., from the engine 84 and/or generator 86 of power system 80), conditions the primary power, and provides an output power to one or more welding devices in accordance with demands of the system 100. The power supply 102 includes the power conversion circuitry 110, which may include transformers, rectifiers, switches, and so forth, capable of converting the AC input power to AC and/or DC output power as dictated by the demands of the system 100 (e.g., particular welding processes and regimes). The power conversion circuitry 110 converts input power (e.g., the primary power 108) to welding-type power based on a weld voltage setpoint and outputs the welding-type power via a weld circuit.

In some examples, the power conversion circuitry 110 is configured to convert the primary power 108 to both welding-type power and auxiliary power outputs. However, in other examples, the power conversion circuitry 110 is adapted to convert primary power only to a weld power output, and a separate auxiliary converter 111 is provided to convert primary power to auxiliary power. In some other examples, the power supply 102 receives a converted auxiliary power output directly from a wall outlet. Any suitable power conversion system or mechanism may be employed by the power supply 102 to generate and supply both weld and auxiliary power.

The control circuitry 112 controls the operation of the power supply 102 and may control the operation of the engine driven system 80 in some examples. The power supply 102 also includes one or more interfaces, such as a user interface 114 and network interface 117. The control circuitry 112 receives input from the user interface 114, through which a user may control one or more components (including the engine 84 and/or generator 86), and or choose a process and/or input desired parameters for a welding output (e.g., voltages, currents, particular pulsed or non-pulsed welding regimes, and so forth). The user interface 114 may receive inputs using one or more input devices 115, such as via a keypad, keyboard, physical buttons, a touch screen (e.g., software buttons), a voice activation system, a wireless device, remote device 94, etc. Furthermore, the control circuitry 112 controls operating parameters based on input by the user as well as based on other operating parameters. Specifically, the user interface 114 may include a display 116 for presenting, showing, or indicating, information to an operator. In some examples, the control circuitry 112 receives an input provided via remote device 94 via network interface 117. In this manner, the control circuitry 112 can provide data regarding operation of the system 80 (including alerts associated with operation of the engine 84) and/or receive commands from the remote device 94 (e.g., starting the engine 84).

The control circuitry 112 may also include interface circuitry for communicating data to other devices in the system 100, such as the wire feeder 104. For example, in some situations, the power supply 102 wirelessly communicates with other welding devices within the welding system 100. Further, in some situations, the power supply 102 communicates with other welding devices using a wired connection, such as by using a network interface controller (NIC) to communicate data via a network (e.g., ETHERNET, 10baseT, 10base100, etc.). In the example of FIG. 2A, the control circuitry 112 communicates with the wire feeder 104 via the weld circuit via a communications transceiver 118, as described below.

The control circuitry 112 includes at least one controller or processor 120 that controls the operations of the power supply 102. The control circuitry 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

The example control circuitry 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, deposition rate, wire feed speed, puddle fluidity, and so forth.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding related data, detect short circuit parameters, determine amount of spatter) during operation. One or more lists or look up tables may be provided, and/or network connections to various databases available to inform decision-making, such as to access preferred welding parameters, to store updated welding parameter settings, etc.

In some examples, the control circuitry 112 stores one or more lists associated with values associated with characteristics associated with current, voltage, power and/or other values that correlate the characteristics to engine speed, such as in memory 124. In some examples, the control circuitry 112 includes a sensor 98 to receive, analyze and/or measure signal characteristics, such as the signal from the current transformer 92. The control circuitry 112 can access the one or more lists in response to an input (e.g., from an operator input). An input can be provided via user interface 114 and/or from remote device 94 via network interface 117. In some examples, the control circuitry 112 is configured to access a list of engine speed values corresponding to threshold engine speed values. In examples, the threshold engine speed value can be adjusted by an operator, in response to a calculation, and/or deleted and removed from memory 124 in response to an operator input. The control circuitry 112 is further configured to compare the list of engine speed values to the calculated engine speed value, and control the system to prevent the starter motor from activating.

In some examples, the welding power flows from the power conversion circuitry 110 through a weld cable 126 to the wire feeder 104 and the welding torch 106. The example weld cable 126 is attachable and detachable from weld studs at each of the power supply 102 and the wire feeder 104 (e.g., to enable ease of replacement of the weld cable 126 in case of wear or damage). Furthermore, in some examples, welding data is provided with the weld cable 126 such that welding power and weld data are provided and transmitted together over the weld cable 126. The communications transceiver 118 is communicatively coupled to the weld cable 126 to communicate (e.g., send/receive) data over the weld cable 126. The communications transceiver 118 may be implemented using serial communications (e.g., full-duplex RS-232 or RS-422, or half-duplex RS-485), network communications (e.g., Ethernet, PROFIBUS, IEEE 802.1X wireless communications, etc.), parallel communications, and/or any other type of communications techniques. In some examples, the communications transceiver 118 may implement communications over the weld cable 126.

The example communications transceiver 118 includes a receiver circuit 121 and a transmitter circuit 122. Generally, the receiver circuit 121 receives data transmitted by the wire feeder 104 via the weld cable 126 and the transmitter circuit 122 transmits data to the wire feeder 104 via the weld cable 126. The communications transceiver 118 enables remote configuration of the power supply 102 from the location of the wire feeder 104, and/or command and/or control of the wire feed speed output by the wire feeder 104 and/or the weld power (e.g., voltage, current) output by the power supply 102. In some examples, the communications are transmitted via a dedicated cable between components and/or wireless communications channels, as well as other suitable communications devices and/or techniques.

The example wire feeder 104 also includes a communications transceiver 119, which may be similar or identical in construction and/or function as the communications transceiver 118. While communication over a separate communications cable is illustrated in FIG. 21A, other communication media, such as wireless media, power line communications, and/or any other communications media, may be used.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 112 to enable, inhibit, or control gas flow (e.g., shielding gas) through the valve 130. Shielding gas exits the valve 130 and flows through a cable 132 (which in some implementations may be packaged with the welding power output) to the wire feeder 104, which provides the shielding gas to the welding application. In some examples, the welding system 100 does not include the gas supply 128, the valve 130, and/or the cable 132.

In some examples, the wire feeder 104 uses the welding power to power the various components in the wire feeder 104, such as to power a wire feeder controller 134. As noted above, the weld cable 126 may be configured to provide or supply the welding power. The power supply 102 may also communicate with a communications transceiver 119 of the wire feeder 104 using the weld cable 126 and the communications transceiver 118 disposed within the power supply 102. In some examples, the communications transceiver 119 is substantially similar to the communications transceiver 118 of the power supply 102. The wire feeder controller 134 controls the operations of the wire feeder 104. In some examples, the wire feeder 104 uses the wire feeder controller 134 to detect whether the wire feeder 104 is in communication with the power supply 102 and to detect a current welding process of the power supply 102 if the wire feeder 104 is in communication with the power supply 102.

In examples, the power supply 102 delivers a power output directly to torch 106 without employing any contactor. In such an example, power regulation is governed by the control circuitry 112 and/or the power conversion circuitry 110. In some examples, a contactor 135 (e.g., high amperage relay) is employed and controlled by the wire feeder controller 134 and configured to enable or inhibit welding power to continue to flow to the weld cable 126 for the welding application. In some examples, the contactor 135 is an electromechanical device. However, the contactor 135 may be any other suitable device, such as a solid-state device. The wire feeder 104 includes a wire drive 136 that receives control signals from the wire feeder controller 134 to drive rollers 138 that rotate to pull wire off a spool 140 of wire. The wire is provided to the welding application through a torch cable 142. Likewise, the wire feeder 104 may provide the shielding gas from the cable 132 through the cable 142. The electrode wire, the shield gas, and the power from the weld cable 126 are bundled together in a single torch cable 144 and/or individually provided to the welding torch 106. In some examples, the contactor 135 is omitted and output or welding-type power is initiated and stopped by the power supply 102 without employing a contactor 135. In some examples, one or more sensors 127 are included with or connected to in the wire feeder 102 to monitor one or more welding parameters (e.g., power, voltage, current, wire feed speed, etc.) to inform the controller 134 during the welding process. In some examples, one or more sensors are included in the welding power supply 102.

The welding torch 106 delivers the wire, welding power, and/or shielding gas for a welding application. The welding torch 106 is used to establish a welding arc between the welding torch 106 and a workpiece 146. A work cable 148 couples the workpiece 146 to the power supply 102 (e.g., to the power conversion circuitry 110) to provide a return path for the weld current (e.g., as part of the weld circuit). The example work cable 148 is attachable and/or detachable from the power supply 102 for ease of replacement of the work cable 148. The work cable 148 may be terminated with a clamp 150 (or another power connecting device), which couples the power supply 102 to the workpiece 146. In some examples, one or more sensors 147 are included with or connected to the welding torch 106 to monitor one or more welding parameters (e.g., power, voltage, current, wire feed speed, etc.) to inform the controller 134 and/or 112 during the welding process. Although illustrated with the torch 106 (e.g., a welding tool, as described herein) connecting through wire feeder 104, in some examples the welding tool can connect directly to the welding power supply 102. For instance, a gouging and/or cutting tool may connect directly to studs or another power outlet of the welding power supply 102. In some examples, a wire feeder is integrated with the power supply, and studs or other power outlets are provided on the housing of such an integrated enclosure.

FIG. 2B is a schematic diagram of another example welding system 152 in which the wire feeder 104 includes the user interface 114 in addition or as an alternative to the user interface on the welding power supply 102. In the example of FIG. 2B, the control circuitry 134 of the wire feeder 104 implements the determinations of the welding program and welding parameters which are described with reference to the control circuitry 112 of FIG. 2A.

FIG. 2C is a schematic diagram of another example welding system 154 including a separate user interface 156. The user interface 156 is a separate device, and may be connected to the welding power supply 102 and/or to the wire feeder 104 to provide commands and/or control information. The example user interface 156 includes the input devices 115 and the display 116, and includes control circuitry 158. The example control circuitry 158 includes the processor(s) 120 and the memory 124 storing the instructions 125. The example user interface 156 further includes a communications transceiver 119 to enable communications between the user interface 156 and the welding power supply 102 and/or the wire feeder.

Although FIGS. 2A-2C are illustrated as having a user interface (114, 156) incorporated with a particular system, the illustration is exemplary such that one or more of the interfaces disclosed herein as well as additional user interfaces may be incorporated in one or more of the example welding systems disclosed herein. Furthermore, although power supply 102 and wire feeder 104 are illustrated as independent units, in some examples, the power supply and wire feeder can be housed in a single enclosure or otherwise integrated. Additionally or alternatively, a single controller, control circuitry, and/or interface can control operation of the engine driven system 80, the power supply 102, and wire feeder 104, in some examples.

Figure 3:
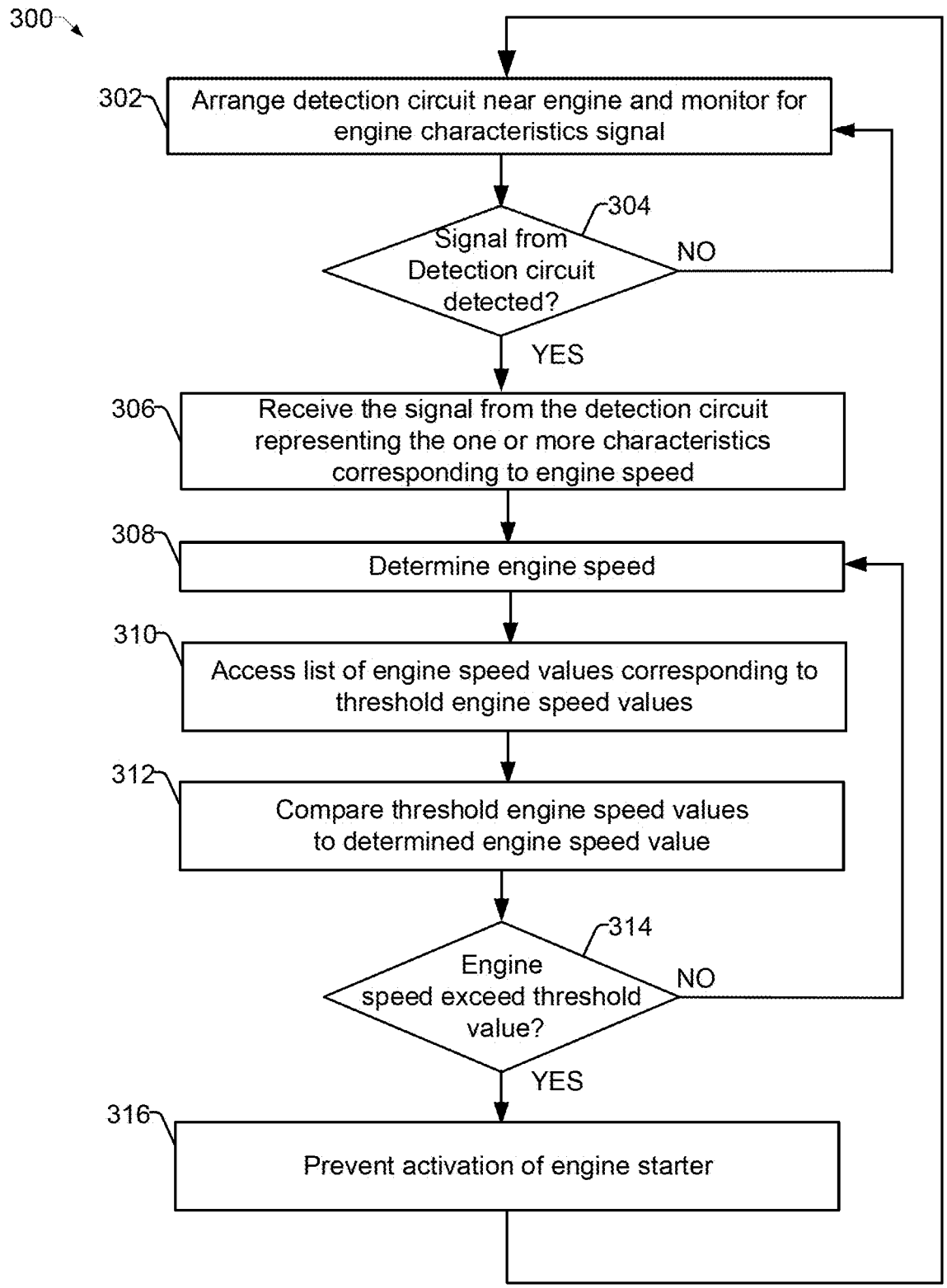
FIG. 3 is a flowchart representative of an example method to prevent activation of a starter when engine speed is above a threshold engine speed value, in accordance with aspects of this disclosure.

FIG. 3 provides a flowchart representative of example machine readable instructions 300 which may be executed by the example system 80 of FIG. 1A. The example instructions 300 may be stored in the storage device(s) 123 and/or the memory 124 and executed by the processor(s) 120 of the control circuitry 112. The example instructions 300 are described below with reference to the systems of FIGS. 1A through 2B.

In block 302, a detection circuit 90 (e.g., an excitation circuit) is arranged near an engine to receive an output from the engine. In examples, an excitation current is generated in the excitation circuit which is synchronized with the engine speed based on rotational movement of the engine.

In block 304, a control circuitry (e.g., control circuitry 112, 152, 154), monitors one or more channels (e.g., cables, interfaces, etc.) for a signal from the current transformer. If a signal is detected, in block 306, the control circuitry receives the signal from the current transformer representing the one or more characteristics corresponding to engine speed (e.g. corresponding to an operating speed of engine 84).

For example, the current transformer 92 is configured to generate an induced current in response to an excitation current from an excitation circuit (of detection circuit 90), wherein the induced current comprises one or more characteristics (e.g., phase, frequency, power, etc.).

In block 308, the control circuitry determines the engine speed based on the one or more characteristics. For example, in determining the engine speed, the control circuit is further configured to calculate the engine speed based on the one or more characteristics of the induced current, and/or to compare the one or more characteristics to a list of values that correlates current characteristics to engine speed.

In block 310, the control circuitry accesses a list of engine speed values corresponding to threshold engine speed values.

In block 312, the control circuitry compares the list of threshold engine speed values to the determined engine speed value, and in block 314, determines whether the determined engine speed value exceeds the threshold engine speed value (e.g., a predetermined threshold value).

In block 316, the control circuitry prevents activation of an engine starter in response to the engine speed exceeding a threshold engine speed value. For example, the control circuitry can activate an interlock to prevent power from reaching the engine starter, or disable one or more user interfaces associated with the engine starter, the user interface comprising one or more of a knob or a graphical user interface. After the control circuitry prevents activation of the engine starter, the method returns to block 302, and continues to monitor for signals from the current transformer. Thus, the control circuitry is configured to enable activation of the engine starter when the signal indicates the engine speed is below the threshold engine speed value (e.g., the engine is off).

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine-readable storage media and to exclude propagating signals.

The control circuitry may identify welding conditions of a given weld and automatically find the optimum value of one or more welding parameters for the welding conditions. An example control circuit implementation may be an Atmel Mega16 microcontroller, a STM32F407 microcontroller, a field programmable logic circuit and/or any other control or logic circuit capable of executing instructions that executes weld control software. The control circuit could also be implemented in analog circuits and/or a combination of digital and analog circuitry. Examples are described herein with reference to various types of welders, but may be used or modified for use in any type of high frequency switching power source.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An engine driven welding power system comprising:
   an engine arranged in an enclosure of the engine driven welding power system;
   a current transformer configured to generate an induced current in response to an excitation current generated in an excitation circuit in response to rotation movement of the engine, wherein the induced current comprises one or more characteristics corresponding to engine speed; and
   a welding power supply comprising a control circuit configured to:
     receive a signal from the current transformer representing the one or more characteristics;
     determine the engine speed based on the one or more characteristics; and
     preventing activation of an engine starter in response to the engine speed exceeding a threshold engine speed value.

2. The engine driven welding power system as defined in claim 1, wherein the excitation circuit is arranged near the engine, such that the excitation current generated in the excitation circuit is synchronized with the engine speed based on rotational movement of the engine.

3. The engine driven welding power system as defined in claim 1, wherein preventing activation of the engine starter comprises activating an interlock to prevent power from reaching the engine starter.

4. The engine driven welding power system as defined in claim 1, wherein preventing activation of the engine starter comprises disabling one or more user interfaces associated with the engine starter, the user interface comprising one or more of a knob or a graphical user interface.

5. The engine driven welding power system as defined in claim 1, wherein to determine the engine speed, the control circuit is further configured to compare the one or more characteristics to a list of values that correlates current characteristics to engine speed.

6. The engine driven welding power system as defined in claim 1, wherein to determine the engine speed, the control circuit is further configured to:
   access a list of engine speed values corresponding to threshold engine speed values; and compare the list of engine speed values to the calculated engine speed value.

7. The engine driven welding power system as defined in claim 1, wherein to determine the engine speed, the control circuit is further configured to calculate engine speed based on the one or more characteristics.

8. The engine driven welding power system as defined in claim 7, wherein the one or more characteristics comprises one or more of a phase, a frequency, a period, a rate of change, or power output.

9. The engine driven welding power system as defined in claim 1, wherein the control circuit is further configured to generate an alert in response to the determination that the engine speed is above the threshold engine speed value.

10. The engine driven welding power system as defined in claim 9, wherein the alert is one or more of an audible, visual, or haptic indicator.

11. The engine driven welding power system as defined in claim 10, wherein the alert is provided via one or more of a first user interface associated with the power system or a second user interface associated with a remote control system.

12. The engine driven welding power system as defined in claim 11, wherein the remote control system is a wireless remote configured to receive data from or transmit data to the control circuit.

13. The engine driven welding power system as defined in claim 1, further comprising a comparator circuit to receive the signal, wherein to determine the engine speed, the comparator circuit compares the one or more characteristics of the signal to one or more predetermined voltage values corresponding to engine speed.

14. An engine driven welding power system comprising:
an engine arranged in an enclosure of the engine driven welding power system;
an edge detection type circuit arranged in the enclosure and external to the engine configured to receive an output of the engine comprising one or more characteristics corresponding to engine speed; and
a welding power supply comprising a control circuit configured to:
receive a signal from the detection circuit representing the one or more characteristics;
determine the engine speed based on the one or more characteristics; and
preventing activation of an engine starter in response to the engine speed exceeding a threshold engine speed value.

15. The engine driven welding power system as defined in claim 14, wherein the detection circuit is a frequency counting circuit.

16. The engine driven welding power system as defined in claim 14, wherein preventing activation of the engine starter comprises disabling one or more user interfaces associated with the engine starter, the user interface comprising one or more of a knob or a graphical user interface.

17. The engine driven welding power system as defined in claim 14, wherein the detection circuit is an excitation circuit arranged near the engine, such that the excitation current generated in the excitation circuit is synchronized with the engine speed based on rotational movement of the engine.

18. The engine driven welding power system as defined in claim 14, further comprising a comparator circuit to receive the signal, wherein to determine the engine speed, the comparator circuit compares the one or more characteristics of the signal to one or more predetermined voltage values corresponding to engine speed.

19. The engine driven welding power system as defined in claim 14, wherein to determine the engine speed, the control circuit is further configured to calculate engine speed based on the one or more characteristics, the one or more characteristics comprises one or more of a phase, a frequency, a period, a rate of change, or power output.

20. An engine driven welding power system comprising:
an engine arranged in an enclosure of the engine driven welding power system;
a detection circuit arranged in the enclosure and external to the engine configured to receive an output of the engine comprising one or more characteristics corresponding to engine speed; and
a welding power supply comprising a control circuit configured to:
receive a signal from the detection circuit representing the one or more characteristics;
determine the engine speed based on the one or more characteristics; and
preventing activation of an engine starter in response to the engine speed exceeding a threshold engine speed value, wherein preventing activation of the engine starter comprises disabling one or more user interfaces associated with the engine starter, the user interface comprising one or more of a knob or a graphical user interface.

* * * * *